United States Patent
Hwang et al.

(10) Patent No.: US 7,751,387 B2
(45) Date of Patent: Jul. 6, 2010

(54) MODIFIED NAT FIREWALL TRAVERSAL METHOD FOR SIP COMMUNICATION

(76) Inventors: Shaw-Hwa Hwang, 10F-2, No. 88, University Road, Hsinchu (TW); Yao-Hsing Chung, 4F, No. 12, Lane 95, Sec. 1, Huanhe W. Rd., Yonghe City, Taipei County (TW)

(*) Notice: Subject to any disclaimer, the term of this patent is extended or adjusted under 35 U.S.C. 154(b) by 604 days.

(21) Appl. No.: 11/527,490

(22) Filed: Sep. 27, 2006

(65) Prior Publication Data
US 2008/0013524 A1    Jan. 17, 2008

(30) Foreign Application Priority Data
Jul. 11, 2006    (TW) .............................. 95125189 A

(51) Int. Cl.
*H04L 12/28* (2006.01)
(52) U.S. Cl. ..................................................... 370/352
(58) Field of Classification Search ................. 370/252, 370/401, 390, 230, 352
See application file for complete search history.

(56) References Cited

U.S. PATENT DOCUMENTS

2006/0056409 A1* 3/2006 Piche et al. ................. 370/389

* cited by examiner

*Primary Examiner*—Dang T Ton
*Assistant Examiner*—Li Zhou
(74) *Attorney, Agent, or Firm*—Bacon & Thomas, PLLC.

(57) ABSTRACT

A modified NAT firewall traversal method for SIP communication is based on the common SIP network phone communication protocol, and is aided by Interactive NAT Traversal (INT) and pre-established media session ideas to accomplish the object of transversing NAT firewall. Users of private IP located within different NAT firewalls can therefore directly transmit voice packets by means of peer-to-peer transmission without the need of any proxy server of voice packets.

13 Claims, 5 Drawing Sheets

MODIFIED NAT FIREWALL TRAVERSAL METHOD FOR SIP COMMUNICATION

BACKGROUND OF THE INVENTION

1. Field of the Invention

The present invention relates to a modified session initiation protocol (SIP) voice over IP (VoIP) communication protocol and, more particularly, to a modified SIP communication method capable of transversing network address translation (NAT) firewall.

2. Description of Related Art

In recent years, the use of network becomes more and more popular. From the earliest dial-up access to today's broadband network, both the upload and download speeds become faster and faster, and more and more services can be provided. In the high bandwidth and mature network environment, the use of voice over internet (VoIP) has gradually become widespread. However, most network users are usually located within a NAT firewall. Today's VoIP protocols cannot apply to network environments with NAT firewall. Within the field of VoIP, the session initiation protocol (SIP) established by the IETF should be the most potential network phone protocol. Although this SIP protocol can transmit SIP instructions or messages via a SIP proxy server, it still cannot solve the problem brought about by firewall and private IP.

Speaking more in detail, NAT firewalls will block packets from the outside. That is, the outside cannot directly transmit data to a user within a firewall. If one wants to use the SIP protocol to build a network phone with a user within a firewall, the user within the firewall cannot receive his request, hence failing the whole process. The process of dialing a SIP network phone can be divided into two stages. The first stage is the transmission of SIP messages of both ends. The second stage is the building of media session of both ends and the transmission of voice packets. Because the data amount involved in the first stage is small, a proxy server can be used for data transmission. But the data amount and the required bandwidth in the second stage are very large. Transmission via a proxy server therefore is not a good method. The best method is to make both ends be able to directly transmit data to each other, which cannot be accomplished with the present SIP protocol. In order to solve this problem, we have to first understand the behaviors of a NAT router.

In common transmission control protocol (TCP) and user datagram protocol (UDP) packets, there are four parameters, respectively being a source IP address, a source port number, a destination IP address and a destination port number. The IP address can be used to discriminate which device sends out or receives this packet, and the port number is used to discriminate different connections on the same device.

FIG. 1 is a diagram showing the variation situation of four parameters during the transmission process of packets between a public network and a private network in the prior art. As shown in FIG. 1, host A and host D are respectively located in two different private networks 12 and 14, whole host B and host C are located in the public network 10. When host A sends out packet #1 to host B, SP1, SA1, DP1 and DA1 carried by the packet #1 represent the source port, the source address, the destination port and the destination address, respectively. After passing a first firewall 16, SP1 and SA1 will be modified to SP1' and SA1' by a first NAT router 18. The first NAT router then sends the modified packet #1' to host B. SA1' is the public IP address of the first NAT router, and SP1' is automatically specified by the first NAT router 18 according to the present communication port. After host B receives the packet #1', it can easily send a packet back to host A located within the first firewall 16 according to the four parameters carried by the packet #1'.

At this time, if host C wants to transmit a packet #2 to host A located within the first firewall 16, the four parameters of the packet #2 only have to satisfy the following conditions for the packet #2 to transverse the first firewall 16 and be transmitted to host A:

$$DA2=SA1' \quad (1)$$

$$DP2=SP1' \quad (2)$$

$$SA2=DA1 \quad (3)$$

$$SP2=DP1 \quad (4)$$

where the four parameters DA2, DP2, SA2 and SP2 can be controlled by host C, and DA1 and DP1 can be determined by host A itself, but SA1' and SP1' are set by the first firewall 16. If host C and host B are not the same device, Eqs. (2) and (3) won't be satisfied because the IP address DA1 of host B in (3) won't be the same as the IP address SA2 of host C, and the SP1' in (2) is a parameter of the packet #1 that is only known to host B, and host C has no way to know about it. Of course, host C can guess the value of the SP1' and set it to DP2, but the probability of guessing right is only 1/65536. In other words, the probability that host C can successfully transmit the packet #2 to host A is (the probability that Eq. (2) is satisfied)×(the probability that Eq. (3) is satisfied)=1/65535×0=0, i.e., impossible.

Moreover, if host D wants to transmit a packet #4 to host A, the four parameters of the packet #4 have to satisfy the following conditions simultaneously for the packet #4 to transverse the first firewall 16 and be transmitted to host A:

$$DA4=SA1' \quad (5)$$

$$DP4=SP3' \quad (6)$$

$$SA4'=DA3 \quad (7)$$

$$SP4'=DP3 \quad (8)$$

where the DA3 and DP3 are controlled by host A, and DA4 and DP4 are set by host D, and the IP address SA1' of the first firewall 16 of the first NAT router 18 and the IP address SA4' of the second firewall 20 of the second NAT router 21 can be known beforehand. Therefore, Eqs. (5) and (7) can be easily satisfied. Because the packet #3 cannot transverse the second firewall 20, host D cannot know the SP3' parameter of the packet #3. But Eqs. (6) and (8) can only be satisfied that the first firewall 16 sets the DP3 to the SP4' value and host D guesses right the SP3' value. However, the DP3 value cannot be set, and the SP4' value cannot be known beforehand. Both the probability that the DP3 exactly equals the SP4' and the probability that host D guesses right the SP3' value are 1/65536. In other words, the probability that both Eqs. (6) and (8) are satisfied is 1/65536×1/65536=1/4294967296. That is, the probability of successful direct exchange of packets of two users located within two different firewalls 16 and 20 approaches zero.

Therefore, in order to apply to the NAT environment, the present invention proposes a modified traversal method for SIP communication, in which newly defined SIP instructions are added in the SIP communication protocol to build a mechanism that can transverse NAT firewalls. Users of private IP located within different NAT firewalls can thus directly transmit voice packets.

SUMMARY OF THE INVENTION

The primary object of the present invention is to provide a modified NAT firewall traversal method for SIP communication, in which a NAT traversal mechanism and a pre-established media session are added in the call procedure of the present SIP communication protocol. Users of private IP located within different NAT firewalls can thus directly transmit voice packets without the need of any proxy server, hence increasing the feasibility of system.

Another object of the present invention is to provide a modified NAT firewall traversal method for SIP communication, whereby successful call connections can be built regardless of public IP to private IP, private IP to public IP or private IP to private IP.

To achieve the above objects, before proceeding the present invention, the calling host and the called host have to register to a SIP proxy server/INT server. If the calling host or the called host is located within a NAT firewall, they are recorded in the SIP proxy server/INT server. The present invention comprises two sessions: a NAT address prediction session and a direct data intercommunication session. In the NAT address prediction session, newly defined instructions and headers are added, and the tests of NAT parameters of the calling host and the called host are separately performed to build a pre-established media session. At this time, there is no real transmission of voice packets in the media session. A formal media session for direct transmission of voice packets is finally built between the calling host and the called host according to the result of the NAT address prediction session.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

The present invention adopts a peer-to-peer direct intercommunication method between private networks to solve the problem that computers within NAT firewalls cannot directly transmit data. In addition to first registering to servers, the present invention can roughly be divided into two sessions: a NAT address prediction session of the calling host and the called host and a direct data intercommunication session. Both the register session and the NAT address prediction session have to rely on a server on a public IP network for registration and detection of NAT routers' parameters to achieve direct communication between private points. The direct data intercommunication session accomplishes direct intercommunication of data packets between two private IP network points without any help from a proxy server. Because the register session occupies almost no bandwidth, and the NAT address prediction session can be finished in a very short time (hardly taking any connection time at all), the two private points can directly transmit a large amount of data for a long time.

Figure 1:
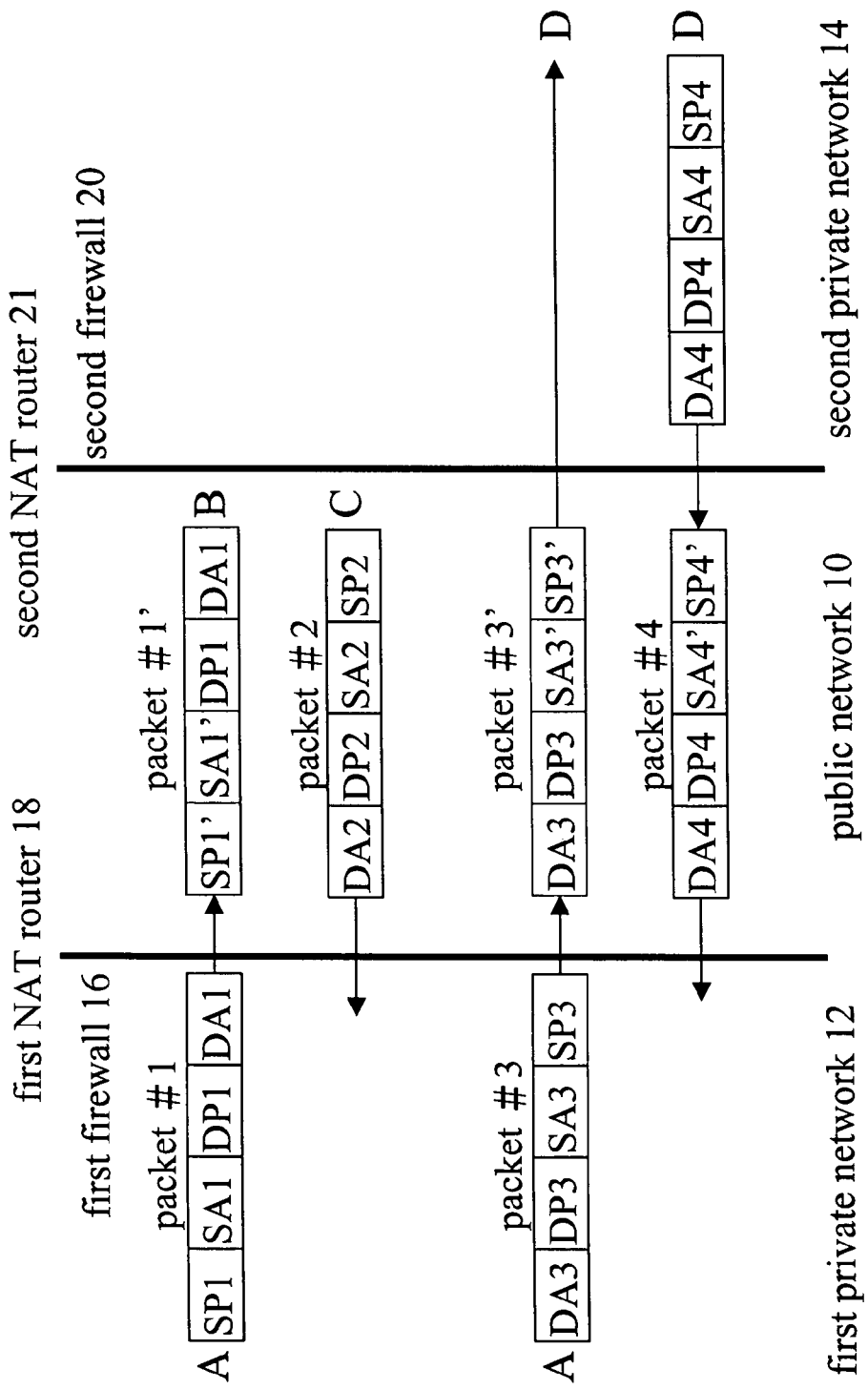
FIG. 1 is a diagram showing the variation situation of four parameters during the transmission process of packets between different networks in the prior art.
Figure 2:
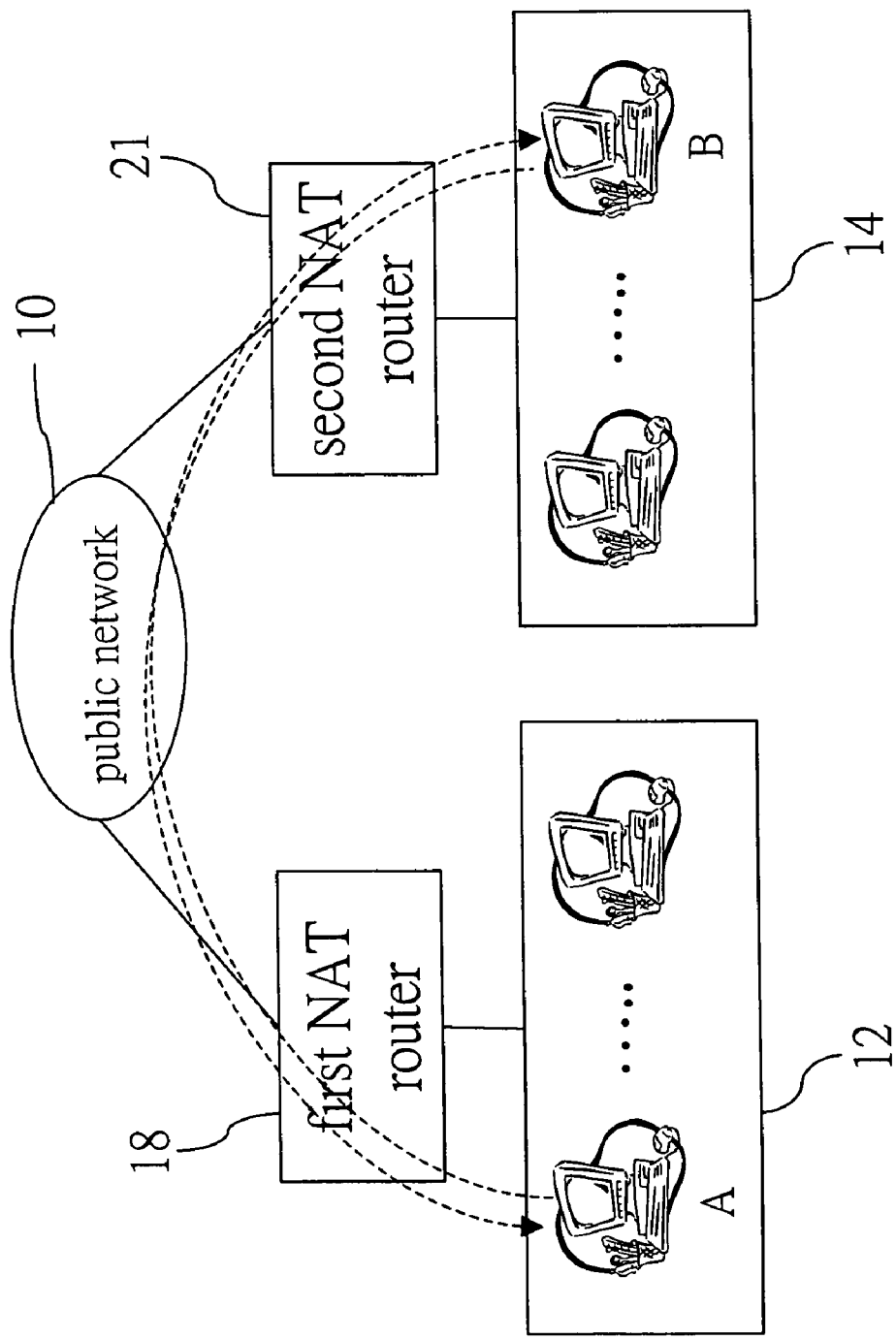
FIG. 2 is a diagram showing peer-to-peer direct intercommunication of a private network of the present invention.

FIG. 2 is a diagram showing peer-to-peer direct intercommunication of a private network of the present invention. As shown in FIG. 2, a first private network 12 and a second private network 14 belong to different private networks, respectively. A first NAT router 18 is the communication bridge between the first private network 12 and a public network 10, and a second NAT router 21 is the communication bridge between the second private network 14 and the public network 10. Packets of point A and point B in the first private network 10 and the second private network 14 can directly be transmitted to each other via the public network 10.

Before direct communication between the two private IP points (point A and point B), an INT (Interactive NAT Traversal)/SIP proxy server is required for registration and test of NAT routers' parameters. Moreover, because the register session occupies almost no bandwidth, and the NAT parameters prediction procedure can be finished in a very short time (hardly taking any connection time at all), the two private IP points can directly transmit a large amount of data for a long time without any the proxy server of voice packets for data transferring. This communication method is a significant technology breakthrough to peer-to-peer communication systems.

The communication method and the idea of pre-established media session proposed by the present invention will be illustrated in detail below.

Figure 3:
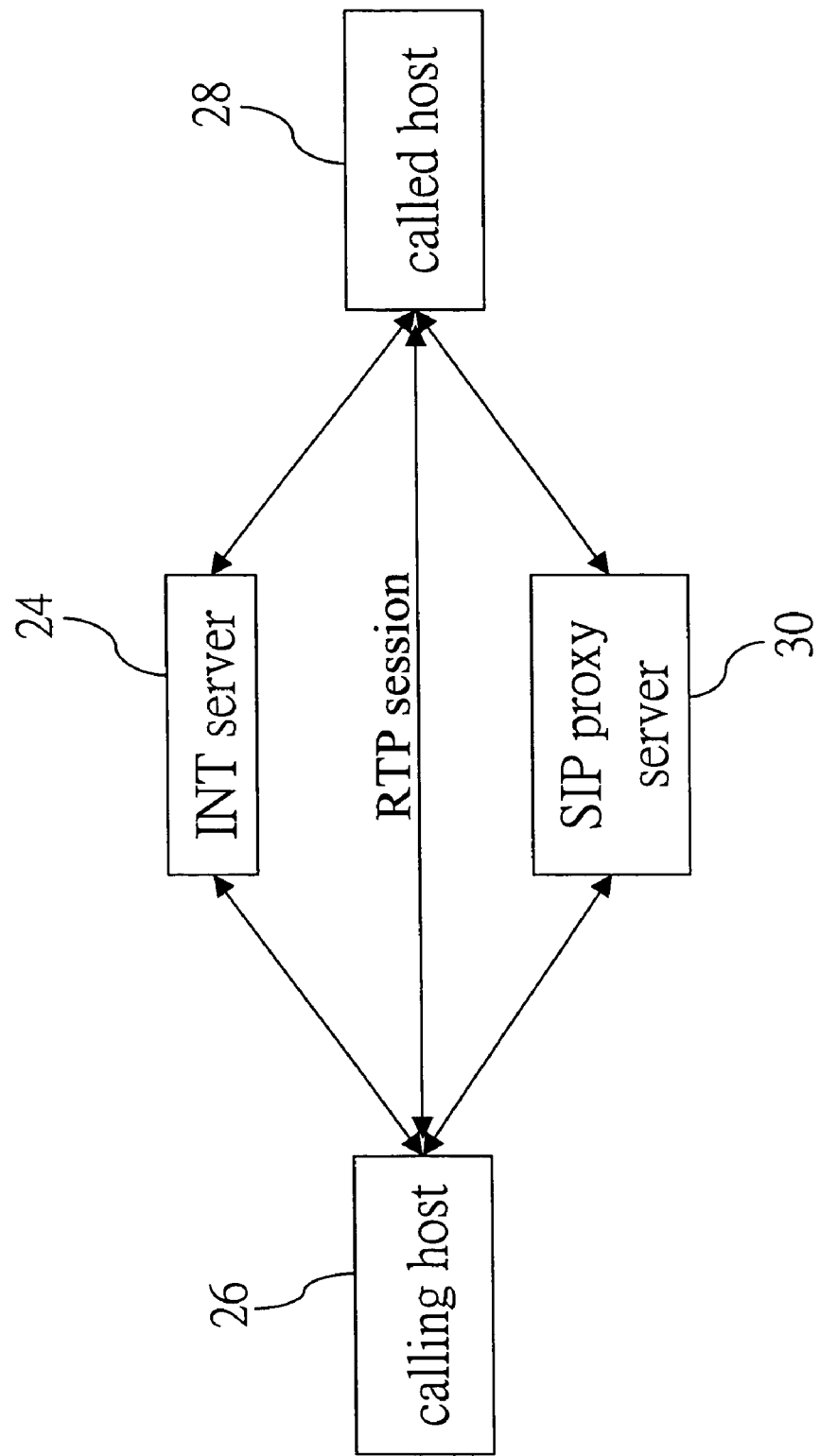
FIG. 3 is a diagram showing the SIP registration session under the NAT environment of the present invention.

First, before the NAT address prediction session and the direct data intercommunication session, both a calling host 26 and a called host 28 have to register to an INT (Interactive NAT Traversal) server 24 and a SIP proxy server 30, as shown in FIG. 3. When the calling host 26 or the called host 28 makes registration, a NAT 24 will also record whether the calling host 24 or the called host 26 is located behind a NAT router.

NAT routers allow that there is no data transmission in M minutes (M>0, usually M≧15) for outward TCP connection, and close the connection after M minutes elapse (different NAT routers have different default values of M). That is, the timer will reset as long as there is any data transmission during the M minutes. Therefore, if a user behind a NAT registers to the server or transmits a keep alive packet to the server once every K minutes (K<M), the connection won't be closed. If the connection is built with UDP instead, because the NAT router will close any UDP connection with no data transmission in a default time (usually in the unit of second), a user within a NAT has to register to the server or transmit a keep alive packet to the server once every a short time (usually 120 to 300 seconds) to keep the connection alive.

Reference is made to FIG. 3 again. After the calling host 26 builds a pre-established media session with the called host 28 via the INT server 24, the calling host 26 and the called host 28 activate the pre-established media session as a formal media session via the SIP proxy server 30 to transmit actual voice packets. The calling host 26 and the called host 28 have already registered to the INT server 24 and the SIP proxy server 30 in the above way.

Figure 4:
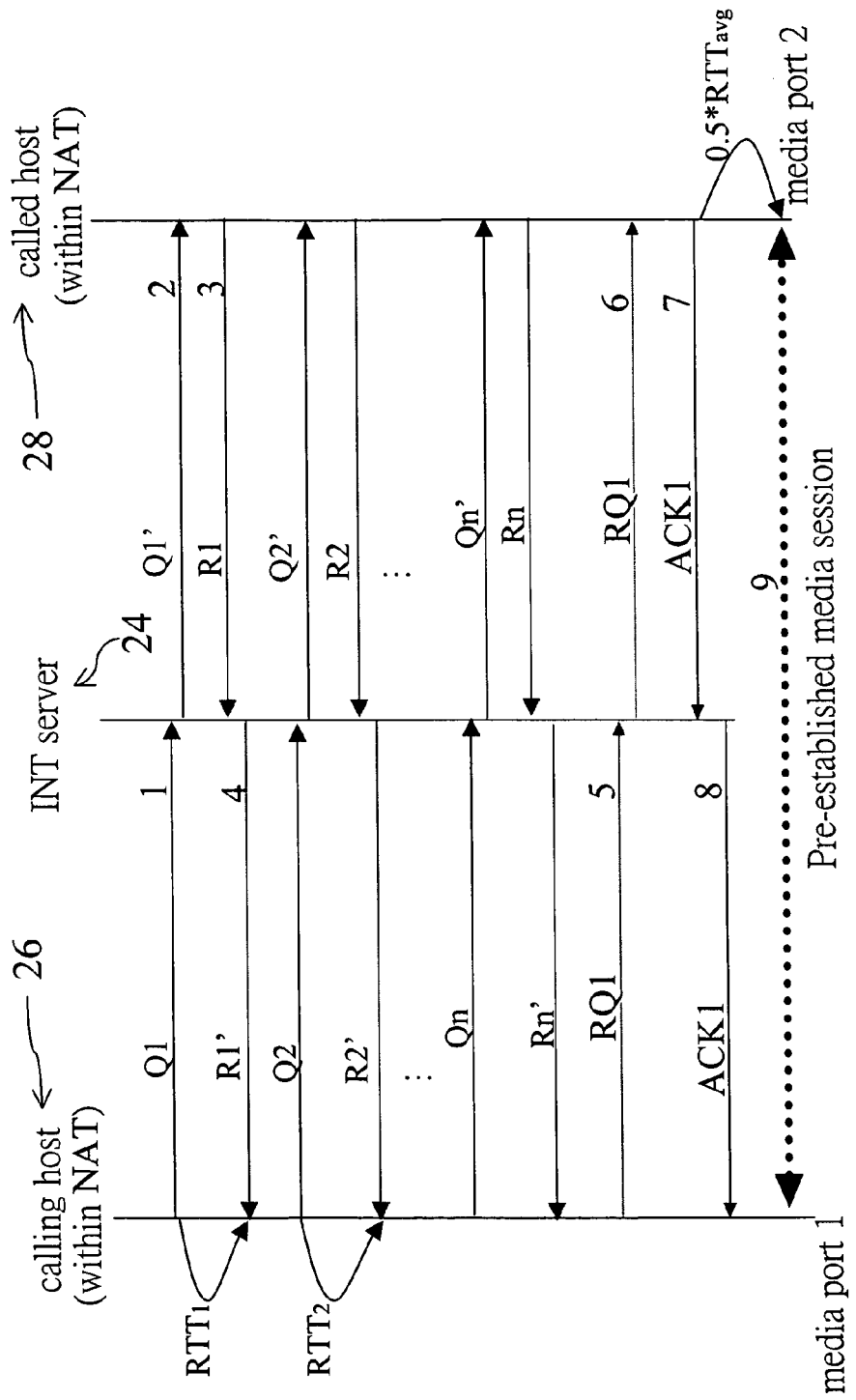
FIGS. 4 and 5 are diagrams showing the flowchart for building a SIP call connection under the NAT environment of the present invention.
Figure 5:
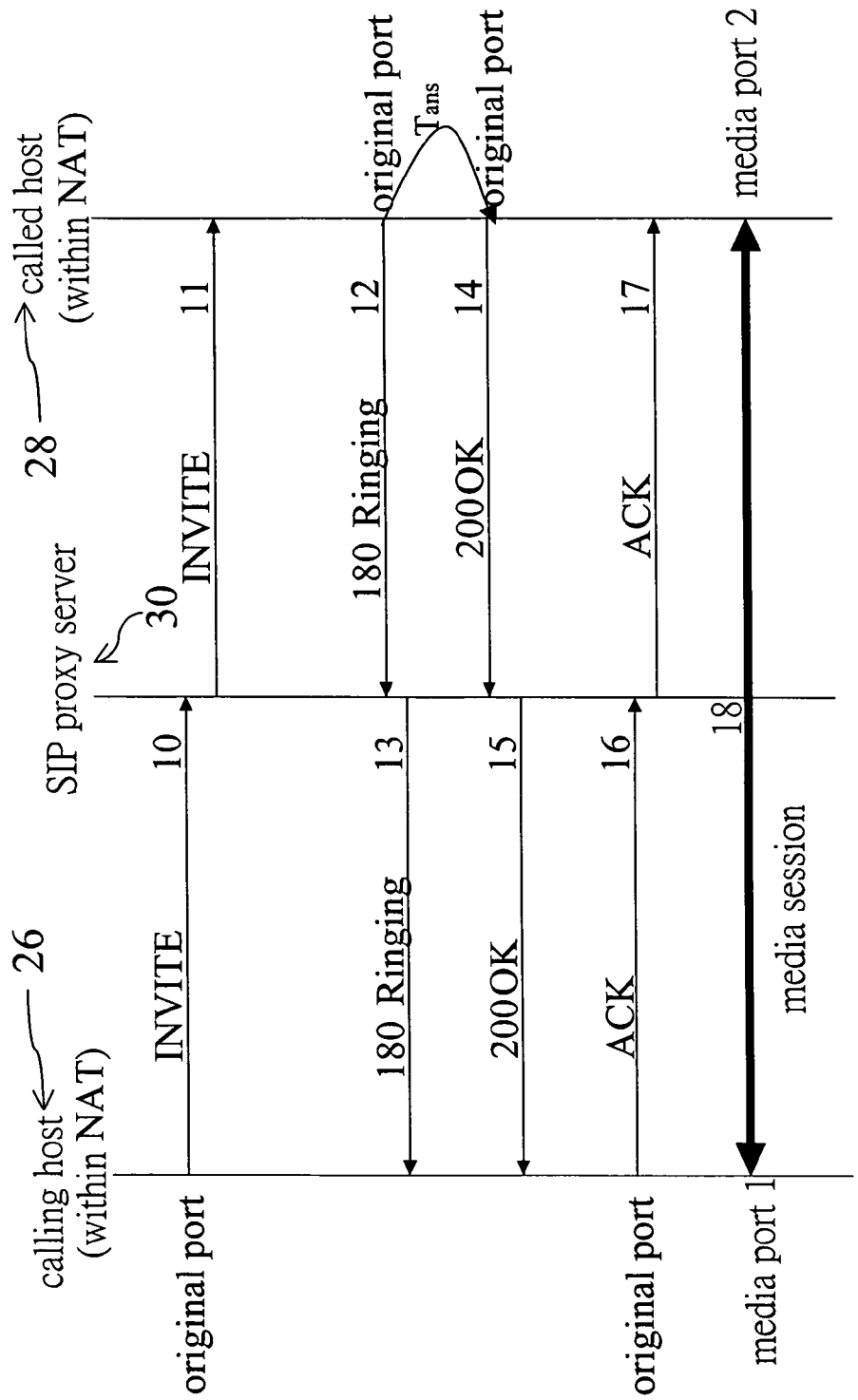

FIGS. 4 and 5 are diagrams showing the flowchart for building a SIP call connection under the NAT environment of the present invention. The original port in the figures is a predetermined port for transmitting SIP messages. It is assumed that each of the calling host 26 and the called host 28 is located behind a NAT router and has already registered to the INT server 24. The registered network addresses are denoted as NAT_Addr_1.$IP_{UAC}$:$Port_{UAC}$ and NAT_Addr_2.$IP_{UAS}$:$Port_{UAS}$, respectively. The flowchart can be divided into 18 steps, including the NAT parameters prediction procedure and the direct data intercommunication session. Reference is made to FIG. 3 as well as FIGS. 4 and 5. The flowchart is illustrated in detail below:

Step 1: The calling host 26 sends out a request $Q_1$ of address prediction from NAT_Addr_1.$IP_1$:$Port_1$ to the INT server 24.

Step 2: The INT server 24 adds NAT_Addr_1.$IP_1$:$Port_1$ into $Q_1$ to form $Q_1'$, which is transferred to NAT_Addr_2.$IP_{UAS}$:$Port_{UAS}$ and then sent to the called host 28.

Step 3: The called host 28 receives $Q_1'$ and replies a response $R_1$ including NAT_Addr_1.$IP_1$:$Port_1$ from NAT_Addr_2.$IP_1'$:$Port_1'$ to the INT server 24.

Step 4: The INT server 24 adds NAT_Addr_2.$IP_1'$:$Port_1'$ into $R_1$ to form $R_1'$, which is transferred to NAT_Addr_1.$IP_{UAC}$:$Port_{UAC}$ and then sent to the calling host 26.

The calling host 26 learns and records the values of NAT_Addr_1.$IP_1$:$Port_1$ and NAT_Addr_2.$IP_1'$:$Port_1'$ extracted from $R_1'$ and also records the time interval $RTT_1$ (Round Trip Time) from sending out $Q_1$ till receiving $R_1'$, as shown in FIG. 4. Subsequently, the calling host 26 also records the time interval $RTT_2$ from sending out $Q_2$ till receiving $R_2$, and so on. The calling host 26 repeats Steps 1~4 until it has observed the variation patterns of IP and Port of both hosts or the number of times of request for transmitting the address prediction reaches an upper limit $L_1$. The calling host 26 then stops the request for transmitting the address prediction.

Step 5: If the calling host 26 has observed the variation patterns of IP and Port of both hosts, has predicted that both hosts will respectively transmit messages from NAT_Addr_1.$IP_n$:$Port_n$ and NAT_Addr_2.$IP_n'$:$Port_n'$, and has calculated out the average RTT to be $RTT_{avg}$, the calling host 26 will transmit a connection request $RQ_1$ from NAT_Addr_1.$IP_{UAC}$:$Port_{UAC}$ to the INT server 24. This $RQ_1$ records the predicted results NAT_Addr_1.$IP_n$:$Port_n$ and NAT_Addr_2.$IP_n'$:$Port_n'$ and $RTT_{avg}$ of the calling host 26.

Step 6: The INT server 24 transfers $RQ_1$ to NAT_Addr_1.$IP_{UAS}$:$Port_{UAS}$ so as to transmit the $RQ_1$ to the called host 28. $RQ_1$ contains the results of prediction procedure (NAT_Addr_1.$IP_n$:$Port_n$ and NAT_Addr_2.$IP_n'$:$Port_n'$ and $RTT_{avg}$).

Step 7: After the called host 28 receives the $RQ_1$, it replies a connection response $ACK_1$ (different from the ACK of SIP) from NAT_Addr_2.$IP_{UAS}$:$Port_{UAS}$ to the INT server 24, and opens a connection to NAT_Addr_1.$IP_n$:$Port_n$ from NAT_Addr_2.$IP_n'$:$Port_n'$ after a time interval of $RTT_{avg}/2$.

Step 8: The INT server 24 transfers $ACK_1$ to NAT_Addr_2.$IP_{UAC}$:$Port_{UAC}$ so as to transmit the $ACK_1$ to the calling host 26.

Step 9: After the calling host 26 receives the $ACK_1$, it immediately builds a connection to NAT_Addr_2.$IP_n'$:$Port_n'$ from NAT_Addr_1.$IP_n$:$Port_n$. The calling host 26 and the called host 28 thus build a pre-established media session using the NAT parameters obtained through the above procedure. At this time, there is no real transmission of voice packets in the media session.

If the address prediction is correct, the pre-established media session can be successfully built. Otherwise, the above steps are repeated until a pre-established media session is successfully built or the number of repetition times reaches an upper limit $L_2$. Besides, the measurement of the $RTT_{avg}$ is for the calling host 26 and the called host 28 to be able to send out packets respectively from NAT_Addr_1.$IPn$:$Port_n$ and NAT_Addr_2.$IP_n'$:$Port_n'$ at approximately the same time so as to prevent one host sending out packets too early or too late, which will cause an ICMP response and make the building of $C_1$ connection fail.

After the NAT parameters prediction procedure is finished, the calling host 26 sends out an "INVITE" request to the called host 28 again, as shown in FIG. 5. Formal SIP communication procedures can thus be carried out through the SIP proxy server 30. Step 10 to Step 18 shown in FIG. 5 will be illustrated in detail below.

Step 10: The calling host 26 sends out an "INVITE" request to SIP Proxy 30 and replaces the fields for building the call connection (say the 'c' and 'm' fields) brought by the SDP message body in the "INVITE" of the calling host 26 with the predicted NAT parameters (NAT_Addr_1.$IP_n$ and NAT_Addr_1:$Port_n$) obtained through the previous procedure.

Step 11: The SIP Proxy 30 forwards the "INVITE" of calling host 26 to called host 28.

Step 12 and Step 13: The called host 28 receives the "INVITE" request and answers with a "180 Ringing" response.

Step 14: The called host 28 accepts the "INVITE" request and answers with a "200 OK" response. The fields for building the call connection (say the 'c' and 'm' fields) brought by the SDP message body in the "200 OK" of the called host 28 are replaced with the predicted NAT parameters (NAT_Addr_2.$IP_n$ and NAT_Addr_2:$Port_n$) obtained through the previous procedure.

Step 15: The SIP Proxy 30 forwards the "200 OK" of called host 28 to calling host 26.

Step 16 and Step 17: The calling host 26 received this final response and replies with an "ACK", hence accomplishes this "INVITE" session.

Step 18: Both the calling host 26 and the called host 28 activate the previously built pre-established media session to transmit voice packets. At this time, the pre-established media session is a formal media session.

In the above embodiment, although an INT server and a SIP proxy server are used before building the pre-established media session and for activating the formal media session, respectively, these two servers can also be integrated together.

The idea of "pre-established media session" proposed by the present invention improves the SIP protocol so that the SIP protocol can play an important role under the NAT environment. The reason why this connection is called "pre-established media session" is that the media session won't have real transmission of voice packets (or RTP packets) before the "INVITE" session finishes successfully. That is, the present invention only builds the media session beforehand and reserves it for the SIP to transmit media packets. Moreover, the present invention chooses to build the pre-established media session as NAT parameters prediction procedure finished instead of accomplishment of "INVITE" session of the SIP ends. This is because that the time (Tans in FIG. 5) from ringing to answering of the called host in the "INVITE" session (SIP signal exchange process) is variable. During this period, the previously predicted NAT parameters may cease to be effective (the ports change and are unpredictable) because another user within the NAT firewall builds an outward connection. Therefore, in order to acquire continuously changed ports for transmission of voice packets, the best way is to build the (pre-established) media session immediately after sufficient NAT parameters are obtained and NAT network address for the next connection of both hosts can be predicted. This is a very important mechanism.

To sum up, the present invention matches a NAT firewall traversal mechanism in the present communication SIP protocol and provides correct media session parameters (IP addresses and ports for media session) of SDP message body in the SIP message to enhance the wholeness of the SIP communication protocol. Successful call connections can be built regardless of public IP to private IP (the called host is within a NAT firewall), private IP to public IP (the calling host is within a NAT firewall) or private IP to private IP (both hosts are within two different NAT firewalls or the same NAT firewall). The transmission of voice packets (RTP packets) can therefore be accomplished without the need of any proxy server of voice packets, hence increasing the feasibility of system.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A modified NAT firewall traversal method for SIP communication comprising:
    (A) a NAT address prediction session comprising the steps of:
    (A1) a calling host sending a request sequence for carrying out address prediction with a called host to an Interactive NAT Traversal (INT) server, and the INT server transferring the request sequence to the called host;
    (A2) the called host replying a response sequence to the calling host via the INT server after receiving the request sequence, the calling host knowing and recording IPs and communication ports that are used from the response sequence, and recording a time interval from sending out the request sequence till receiving the response sequence;
    (A3) the calling host repeating the steps (A1) and (A2) until obtaining the variation patterns of the IPs and the communication ports;
    (A4) the calling host predicting IPs and the communication ports that will be used for transmitting messages by the both hosts, and the calling host transmitting a connection request to the called host via the INT server according to the time interval; and
    (A5) the called host replying a connection response to the calling host via the INT server after receiving the connection request so that the calling host and the called host can build a pre-established media session; and
    (B) a direct data intercommunication session wherein the calling host sends out a request for building a call connection via a SIP proxy server, and
    the called host receives the request, and the calling host and the called host then activate the pre-established media session that has been built beforehand to make the pre-established media session become a formal media session.

2. The modified NAT firewall traversal method for SIP communication as claimed in claim 1 further comprising a register session before carrying out said NAT address prediction session, wherein said calling host and said called host first register to said INT server, and at least one of said calling host and said called host is located within a NAT firewall and recorded in said INT server.

3. The modified NAT firewall traversal method for SIP communication as claimed in claim 2, wherein each of the calling host and the called host is located with the NAT firewall.

4. The modified NAT firewall traversal method for SIP communication as claimed in claim 2, wherein said calling host and said called host make use of TCP to maintain a connected state with said TNT server, and said calling host and said called host register to said INT server again or transmit a keep alive packet to said TNT server every a period of time to maintain the connected state.

5. The modified NAT firewall traversal method for SIP communication as claimed in claim 2, wherein said calling host and said called host make use of UDP to maintain a connected state with said TNT server, and said calling host and said called host register to said TNT server again or transmit a keep alive packet to said TNT server every a few seconds to maintain the connected state.

6. The modified NAT firewall traversal method for SIP communication as claimed in claim 1, wherein the request sequence includes a message body of SIP format for recording the IPs and the communication ports.

7. The modified NAT firewall traversal method for SIP communication as claimed in claim 1, wherein the IPs of the calling host are public IPs used by a NAT router of the calling host.

8. The modified NAT firewall traversal method for SIP communication as claimed in claim 1, wherein the response sequence includes a message body of SIP format for recording the IPs and the communication port.

9. The modified NAT firewall traversal method for-SIP communication as claimed in claim 1, wherein an average time interval can further be calculated out in said step (A4) to prevent said calling host and said called host from sending out packets at the same time.

10. The modified NAT firewall traversal method for SIP communication as claimed in claim 1, wherein the IPs of the called host are public IPs used by a NAT router of the called host.

11. The modified NAT firewall traversal method for SIP communication as claimed in claim 1, wherein said pre-established media session in said Step (A5) is a media session that is built by using the result of said NAT address prediction session.

12. The modified NAT firewall traversal method for SIP communication as claimed in claim 1, wherein the pre-established media session in the Step (A5) is a media session for transmitting voice packets (RTP packets) under a NAT environment.

13. The modified NAT firewall traversal method for SIP communication as claimed in claim 1, wherein said TNT server and said SIP proxy server can be integrated together.

* * * * *